United States Patent [19]

Huber et al.

[11] Patent Number: 5,691,815
[45] Date of Patent: Nov. 25, 1997

[54] LASER INSPECTION TOOL SYSTEM

[75] Inventors: Edward D. Huber, Sunnyvale; Rick A. Williams, Orinda; Scott E. Reinhart, Hayward, all of Calif.

[73] Assignee: Lockheed Missiles & Space Co., Inc., Sunnyvale, Calif.

[21] Appl. No.: 582,154

[22] Filed: Jan. 2, 1996

[51] Int. Cl.⁶ ................................................ G01B 11/02
[52] U.S. Cl. .................. 356/375; 356/381; 250/559.19; 250/559.27
[58] Field of Search .................... 356/372, 375, 356/376, 381; 250/559.19, 559.27, 559.29

[56] References Cited

U.S. PATENT DOCUMENTS

| | | | |
|---|---|---|---|
| 4,488,172 | 12/1984 | Hutchin . | |
| 4,573,073 | 2/1986 | Corby, Jr. | 356/381 |
| 4,575,805 | 3/1986 | Moermann et al. | 364/474 |
| 4,583,857 | 4/1986 | Grammerstorff et al. | 356/375 |
| 4,628,469 | 12/1986 | White | 364/560 |
| 4,641,972 | 2/1987 | Halioua et al. | 356/376 |
| 4,650,333 | 3/1987 | Crabb et al. | 356/376 |
| 4,682,894 | 7/1987 | Schmidt et al. | 356/375 |
| 4,701,047 | 10/1987 | Eibert et al. | 356/376 |
| 4,801,207 | 1/1989 | Williams | 356/376 |
| 4,825,263 | 4/1989 | Desjardins et al. | 356/376 |
| 4,925,308 | 5/1990 | Stern et al. | 356/375 |
| 4,961,155 | 10/1990 | Ozeki et al. | 356/375 |
| 5,076,697 | 12/1991 | Takagi et al. | 356/376 |
| 5,085,502 | 2/1992 | Womack et al. | 356/376 |
| 5,175,601 | 12/1992 | Fitts | 356/376 |
| 5,307,151 | 4/1994 | Hof et al. | 356/376 |

FOREIGN PATENT DOCUMENTS

| | | | |
|---|---|---|---|
| 63-75605 | 4/1988 | Japan | 356/372 |
| 64-9304 | 1/1989 | Japan | 356/372 |
| 3-4108 | 1/1991 | Japan | 356/372 |

OTHER PUBLICATIONS

David R. Burton and Michael J. Lawlor, 'Multichannel Fourier fringe analysis as an aid to automastic phase unwrapping', Applied Optics, May 10, 1994, vol. 33, No. 14, U.S.A.

Katherine Creath, 'Wyko Systems for Optical Metrology', 1987 SPIE Proceeding, vol. 816 Interferometric Metrology, U.S.A.

Chris L. Koliopoulos and Mark Jensen, 'Real–Time Video Rate Phase Processor', 1993, pp. 264–268, SPIE vol. 2003, Interferometry VI, U.S.A.

Daniel Malacara, Optical Shop Testing 1992, pp. 668–681, 'Moiré and Fringe Projection Techniques', John Wiley & Sons, Inc., U.S.A.

Carolyn R. Mercer and Glenn Beheim, 'Fiber–Optic Projected–Fringe Digital Interferometry', Nov. 4–7, 1990, pp. 1–8, NASA Technical Memorandum 103252 U.S.A.

B.F. Oreb, K.G. Larkin, P. Fairman and M. Ghaffari, 'Moire based Optical Surface Profiler for the Minting Industry', 1992, pp. 48–57, SPIE Proceeding, vol. 1776, U.S.A.

James C. Wyant, 'Interferometric Optical Metrology: Basis Principles and New Systems', May 1982, pp. 65–71, Laser Focus, U.S.A.

Yiping Xu and Chiayu Ai, 'Simple and effective phase unwrapping technique', 1993, pp. 254–263, SPIE, vol. 2003, Interferometry VI, U.S.A.

Primary Examiner—F. L. Evans
Attorney, Agent, or Firm—Fenwick & West LLP

[57] ABSTRACT

A laser inspection tool system (100) includes a hand-held remote tool head (108) that provides an image of a target object (116) and a measurement surface (118). The remote tool head (108) includes light sources (208) and mirrors (210) that in conjunction generate two perpendicular lines of light that impinge the target object (116) and the measurement surface (118) and reflect to a form an image in a camera (218) in the remote tool head (108). The remote tool head (108) may be oriented at any angle relative to the measurement surface (118). A processor (102) remotely coupled to the remote tool head (108) captures the image and determines the offset between the light reflected by the target object (116) and the light reflected by the measurement surface (118), and the angle between the reflected lines of light. Using the offset and the angle, the processor (102) determines the height of the top of the target object (116) above the measurement surface (118) and the angle of the remote tool head (108) relative to the measurement surface (118).

15 Claims, 14 Drawing Sheets

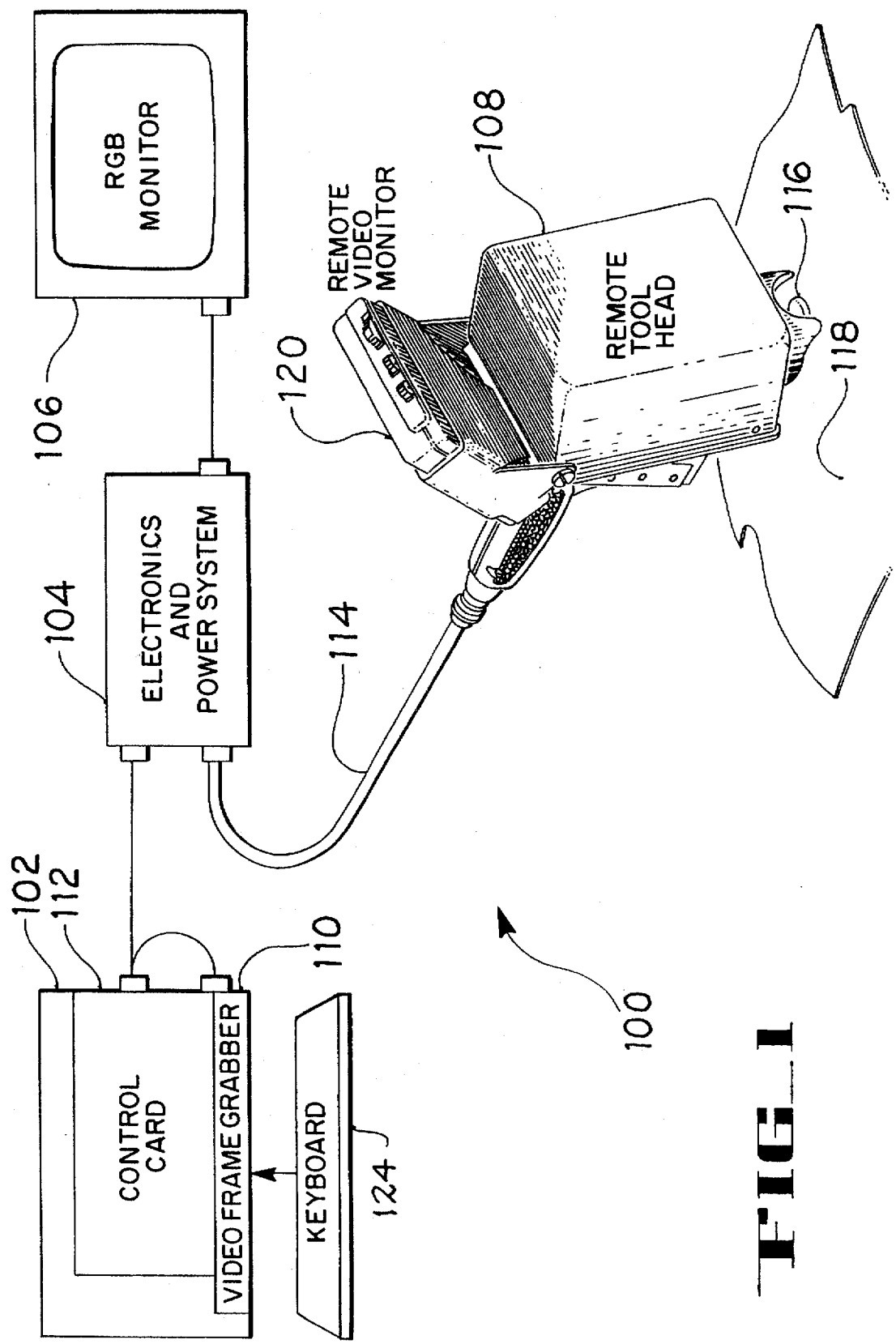

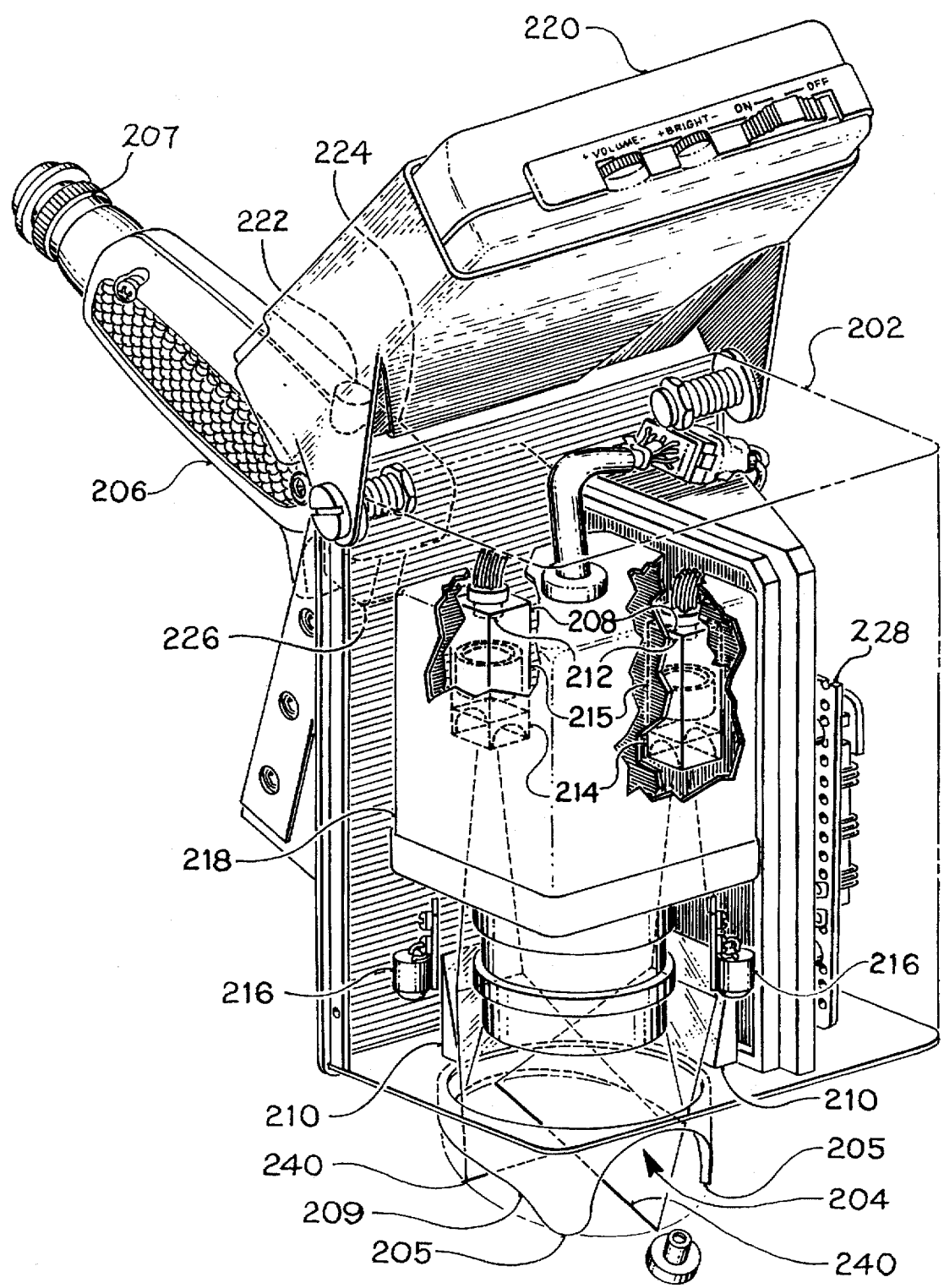
FIG_2

FIG_3
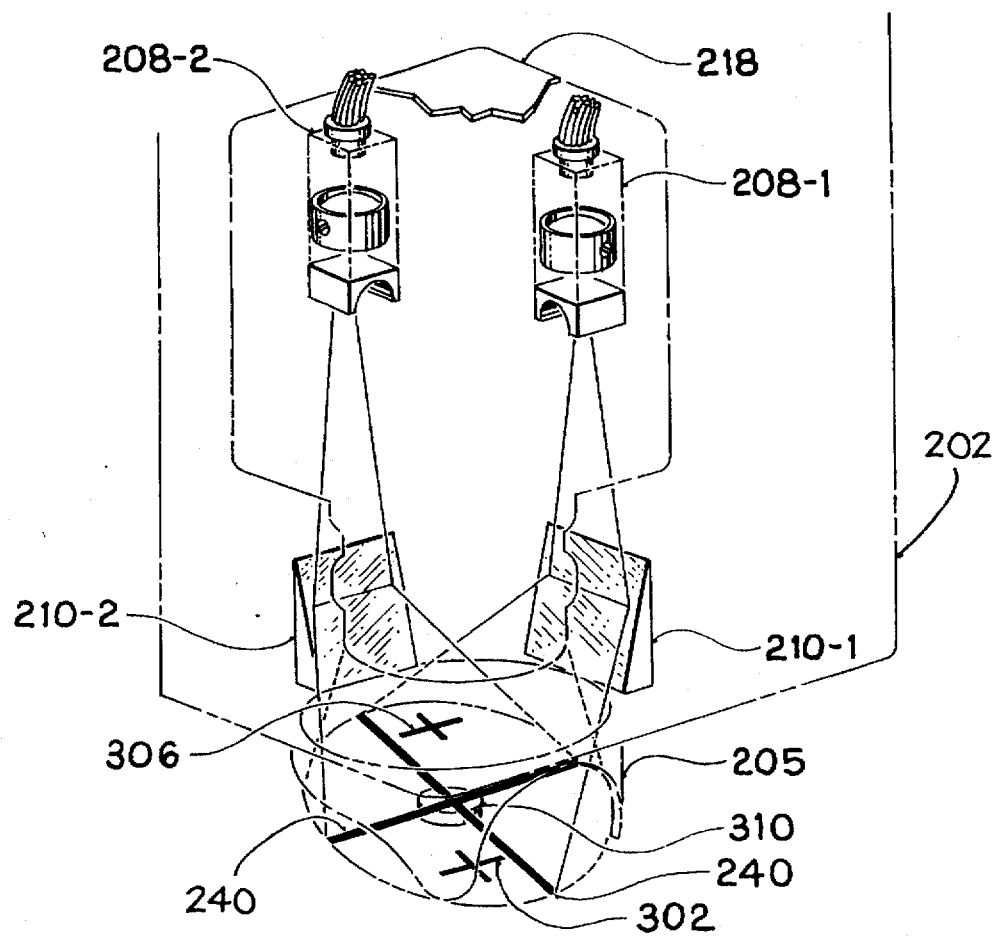
FIG_4
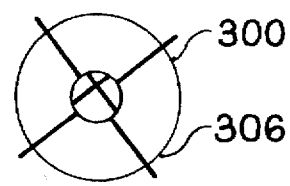
POSITION OF INTERSECT BELOW SURFACE
FIG_5
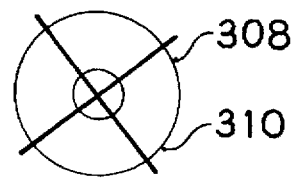
POSITION OF INTERSECT ON FLAT SURFACE
FIG_6
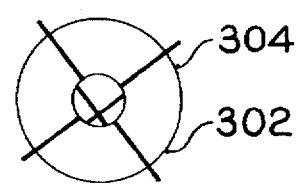
POSITION OF INTERSECT ABOVE SURFACE

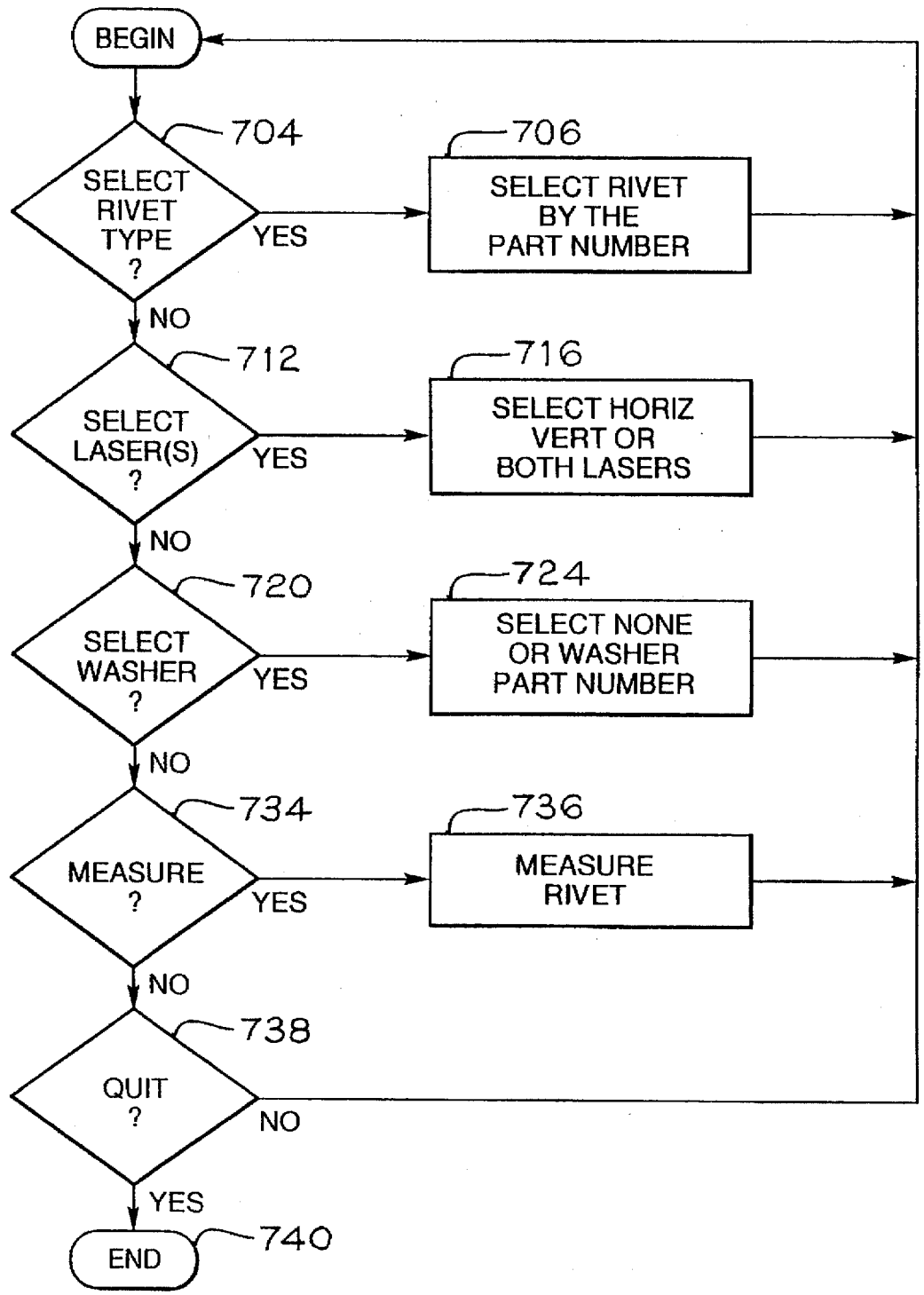

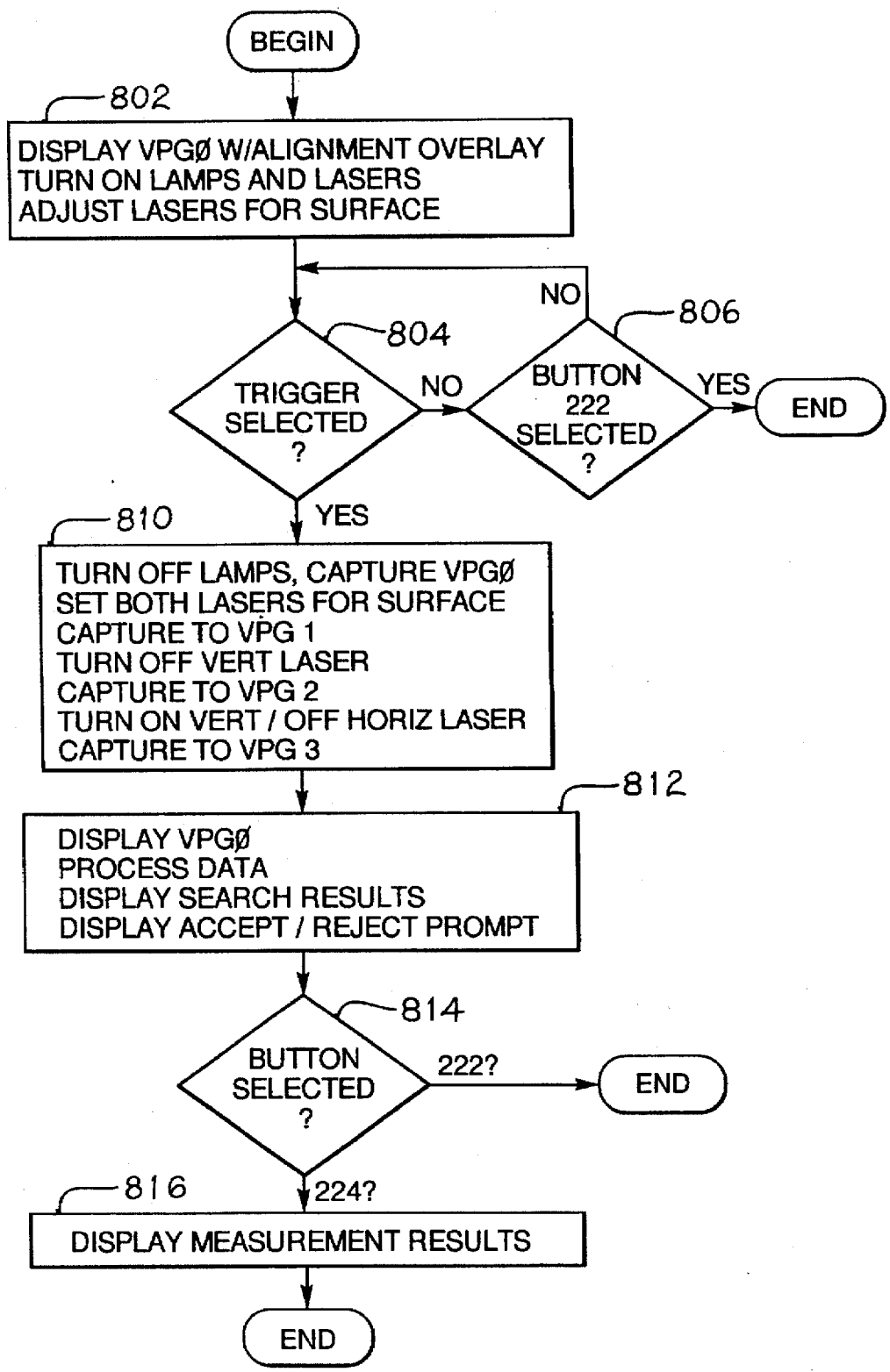
FIG_8

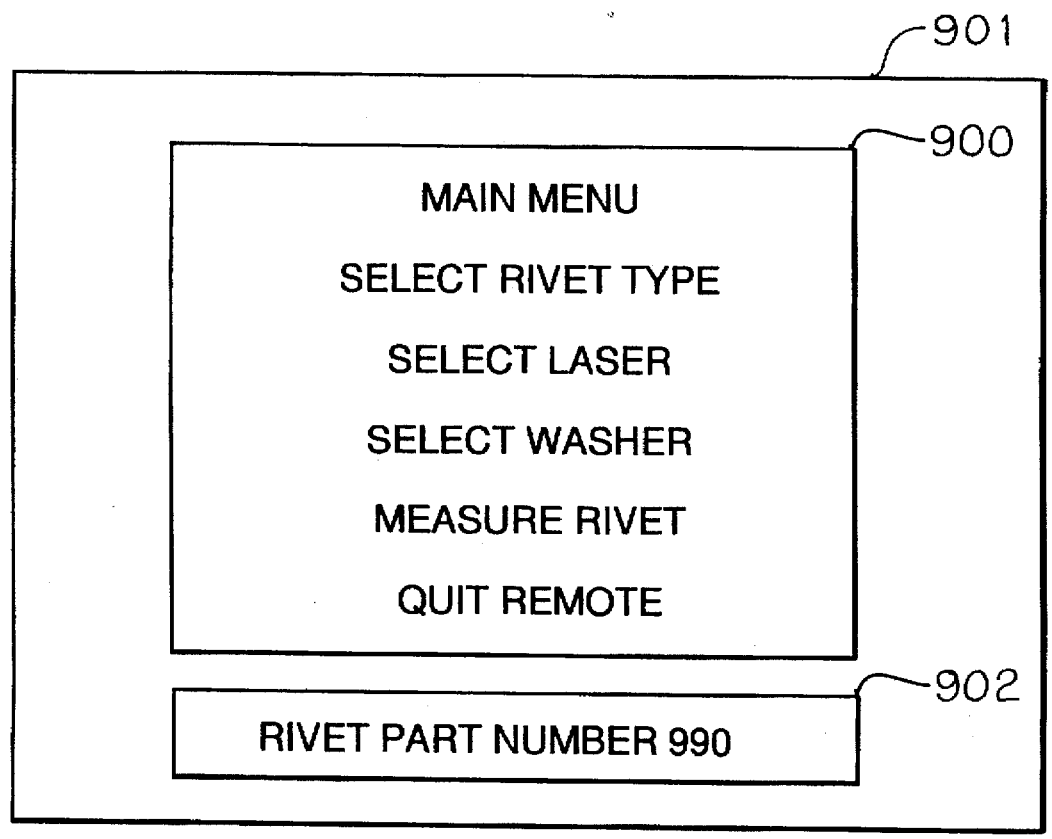
FIG_9

FIG_10
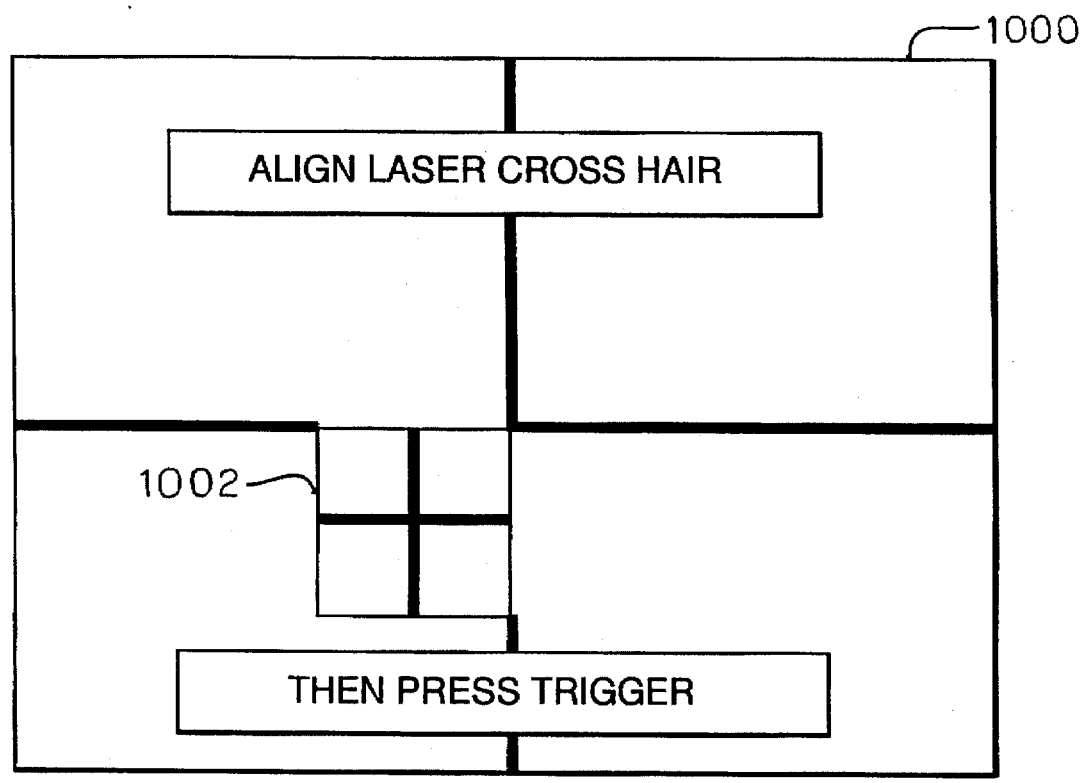

FIG_11
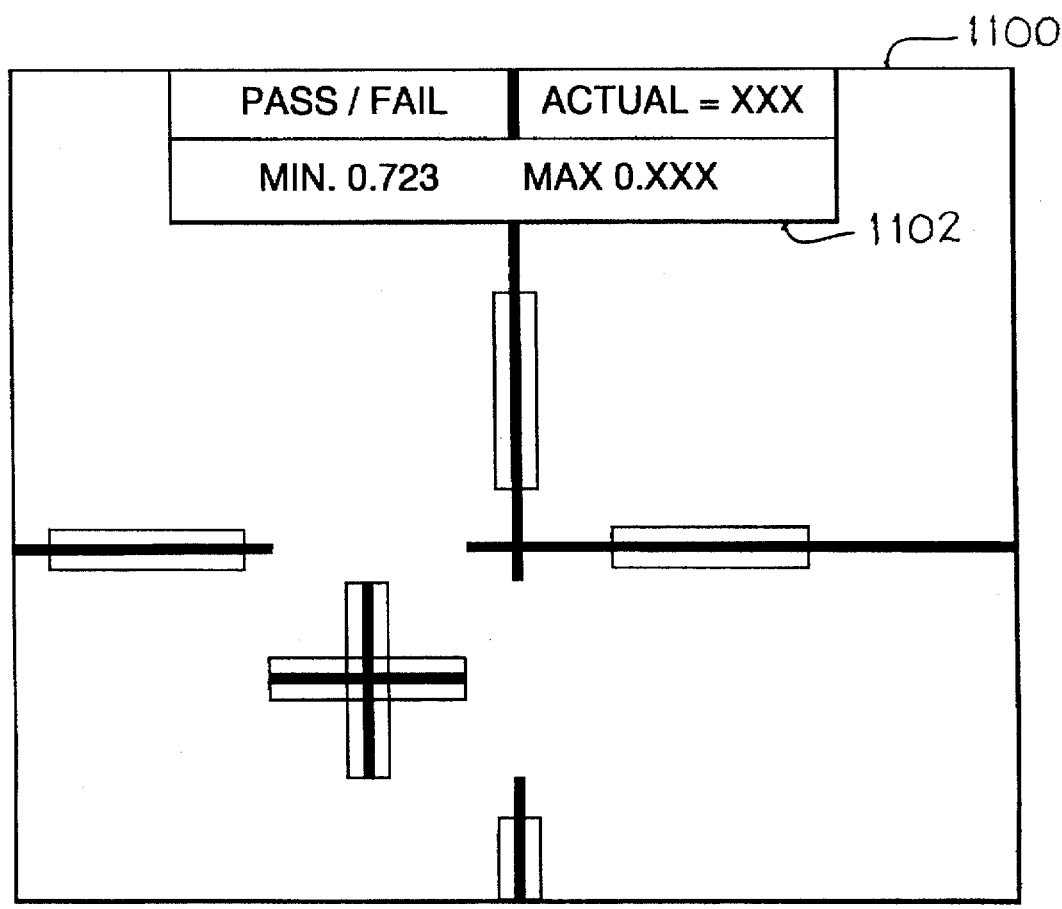

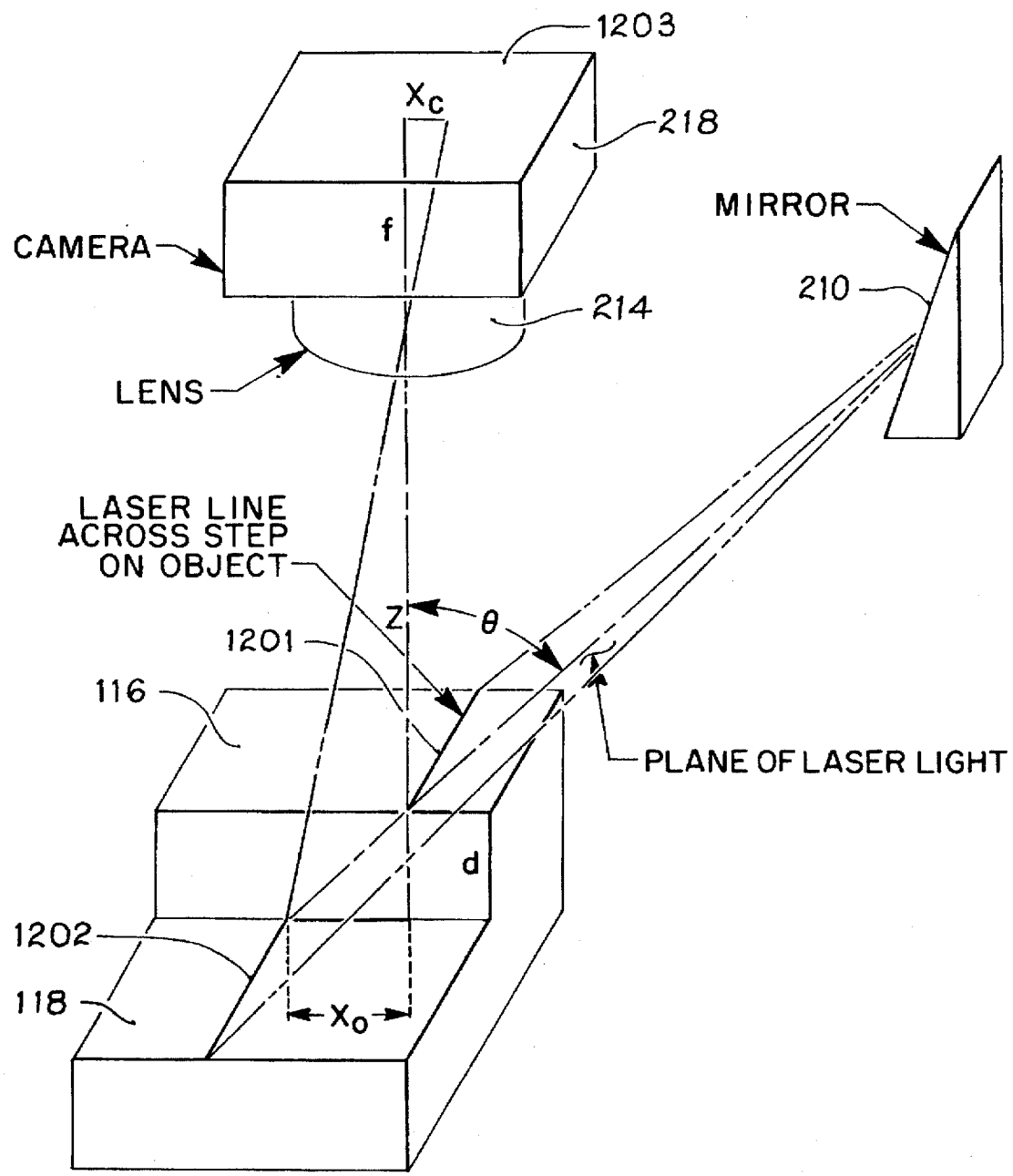
FIG_12

FIG_13
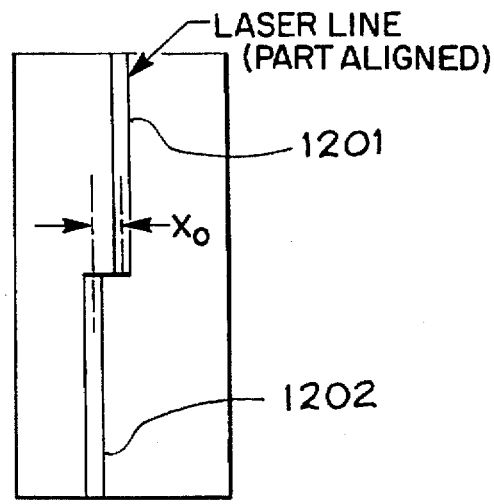
FIG 14
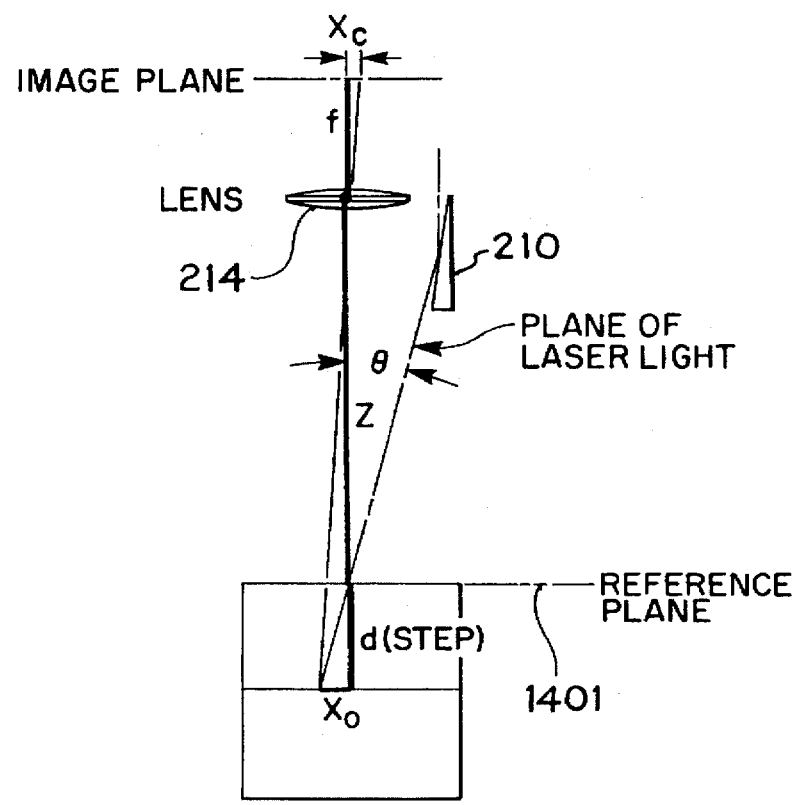

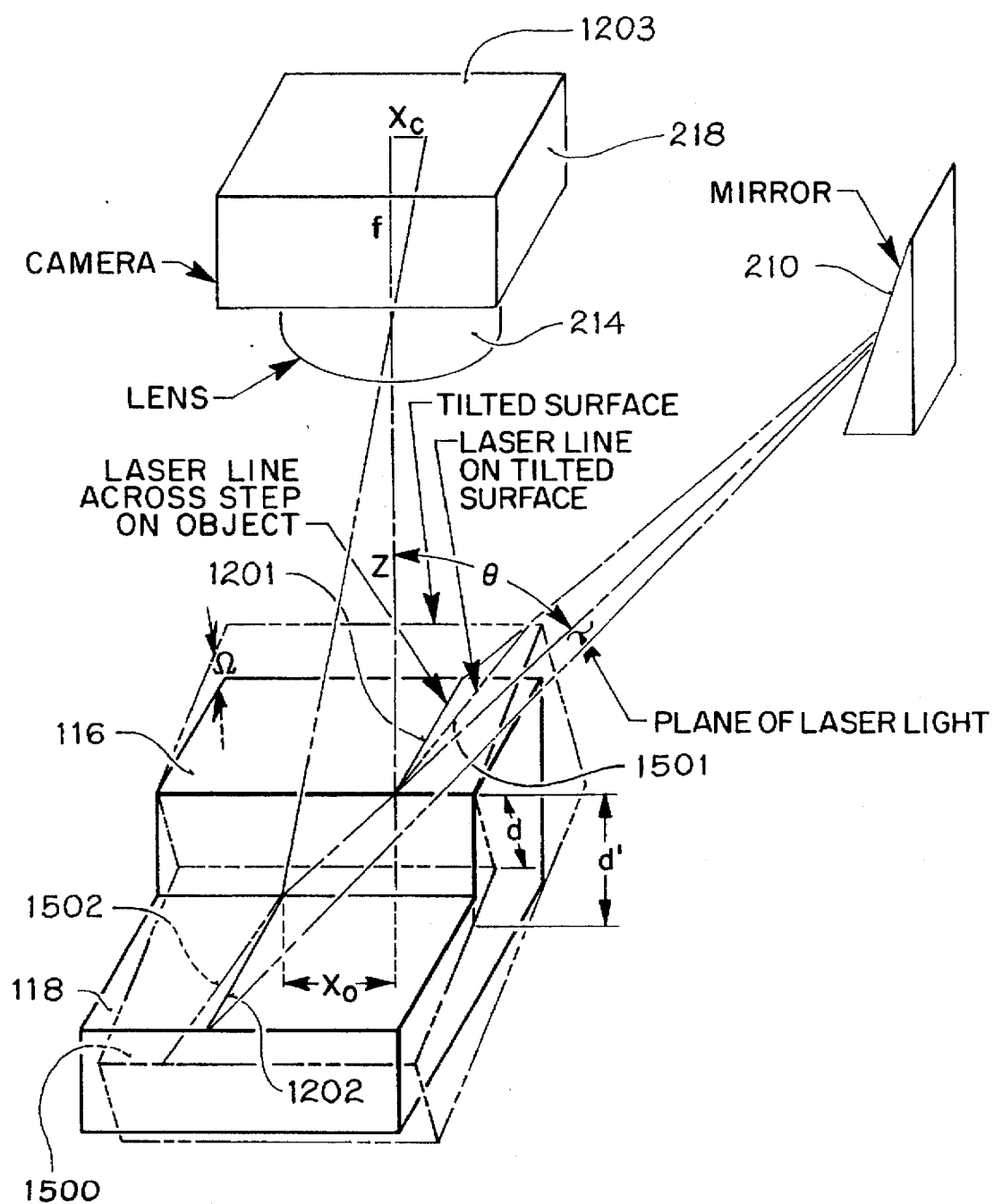
FIG_15

FIG_16
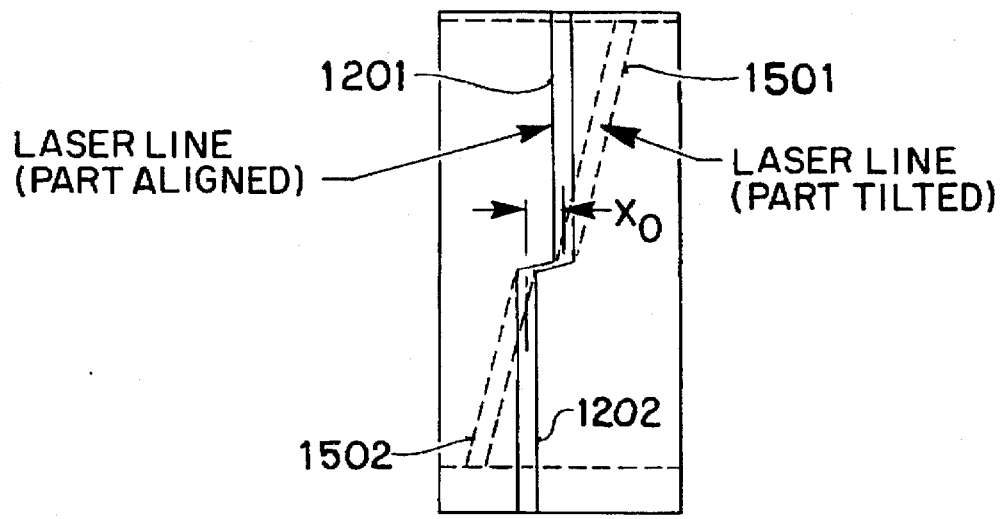
FIG_17
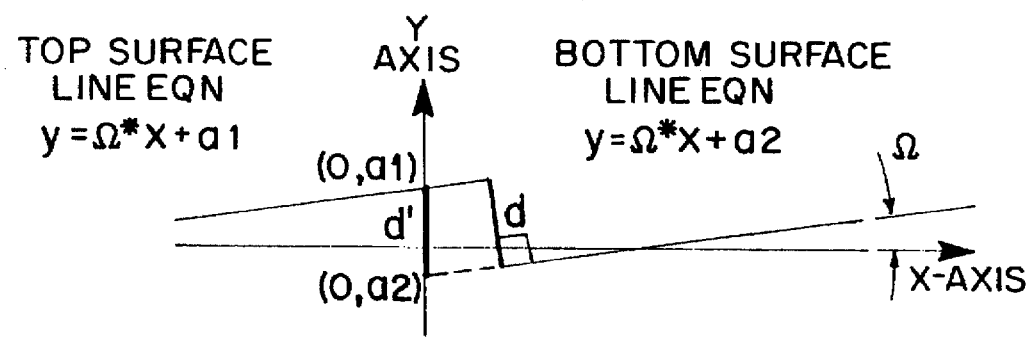

FIG_19
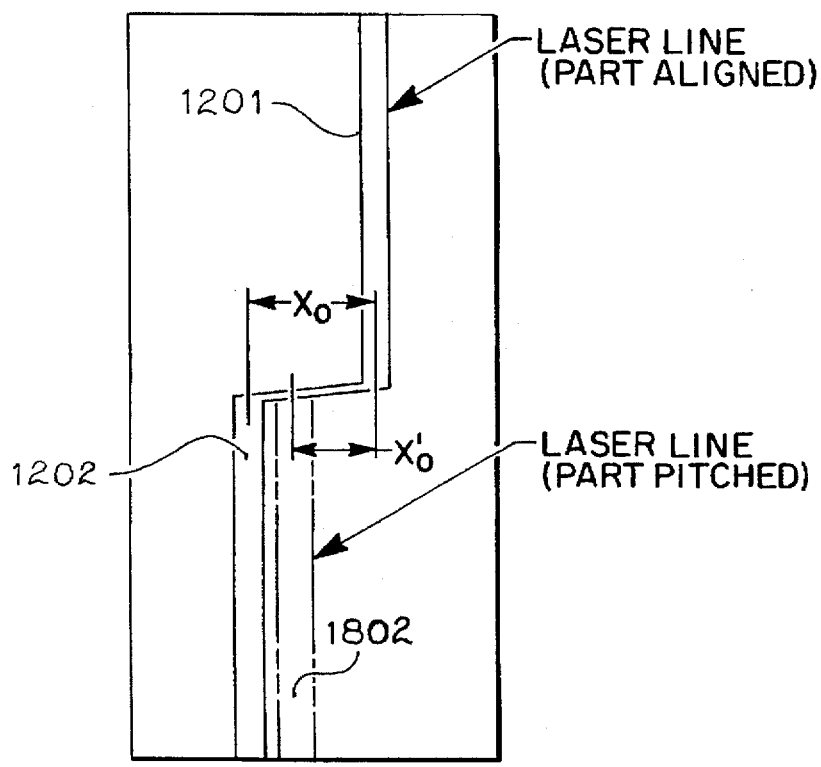
FIG_20
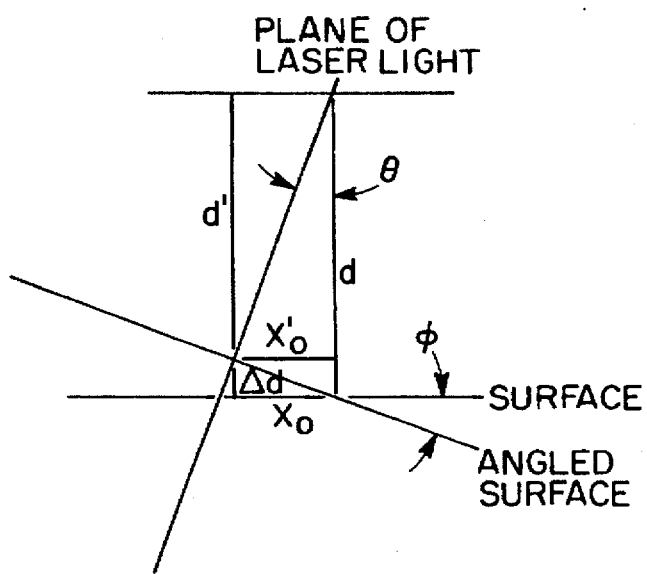

5,691,815

LASER INSPECTION TOOL SYSTEM

FIELD OF THE INVENTION

The invention relates to an inspection system, and more particularly to an inspection system for measuring the height of an object above a surface.

BACKGROUND OF THE INVENTION

Fasteners for securing sheets of metal together are inserted through aligned holes in two sheets. The fasteners are then deformed to fold over the surface of one of the sheets to cover an area larger than the holes. The amount of deformation varies with the type and size of the fastener. The height of the center pin of the formed fastener is indicative of whether the fastener is properly formed. This height is referred to as a fastener break-off height. A fastener break-off height that is too high indicates that the fastener is insufficiently deformed. A fastener break-off height that is too low indicates the fastener is overly deformed.

The fastener break-off height is conventionally measured using manual feeler gauges. For a given fastener type and size, two feeler gauges are used. One feeler gauge is used to determine whether the fastener is too high. Another feeler gauge is used to determine whether the fastener is too low. This method provides only a qualitative pass or fail determination. This method does not provide a quantitative indication of the fastener break-off height relative to a specification limit which could be used by engineers to determine whether replacement of the fastener is required or desired.

The use of manual feeler gauges is very subjective. Different users may obtain different results for the same fastener. Thus a fastener that passes the fastener break-off height test performed by a first user may fail a later test performed by a second user. A failure of the fastener at a later break-off height test may result in more costly rework during later or final assembly stages.

It is desirable to quantitatively measure the break-off height of fasteners and to perform this measurement without manual feeler gauges. It is also desirable to measure the break-off height of fasteners in such a way that the result of the measurement is independent of the person performing the measurement. It is also desirable to automatically record the measurements to eliminate the errors in manual recording.

SUMMARY OF THE INVENTION

In the present invention, an inspection system (100) determines the height of a target object (116) above a measurement surface (118). The inspection system (100) includes a pair of light sources (208) that are spaced apart from the measurement surface (118) and that generate respective first and second lines of light. Both lines of light are projected at a projected angle onto the target object (116) and the measurement surface (118). The lines of light each include two portions when the lines are projected onto the target object (116) which protrudes from the measurement surface (118). A camera (218) is positioned to receive both an image of a first portion of the line of light reflected by the target object (116) and an image of a second portion of the line of light reflected by the measurement surface (118). The received image of the first portion of the first line of light reflected by the target object (116) is offset from the received image of the second portion of the second line of light reflected by the measurement surface (118). The received image of the first portion of the second line of light reflected by the target object (116) is offset from the received image of the second portion of the second line of light reflected by the measurement surface (118). A processor (102) coupled to the camera (218) calculates the offsets between the received light reflected by the target object (116) and the received light reflected by the measurement surface (118) and calculates the height of the target object (116) above the measurement surface (118) using the calculated offsets.

The inspection system (100) also includes a monitor (220) coupled to the camera (218) for displaying the images for alignment of the first line of light with the target object (116) and menus and data. The light source (208) strobes the light line to freeze motion of the camera (218) relative to the measurement surface (118) and the target object (116) and to vary a duty cycle of the light line to set an intensity of the reflected lines of light by the camera (218).

The present invention also includes a method for measuring the height of a target object (116) above a measurement surface (118). The target object (116) and the measurement surface (118) are impinged with a first line of light at a first selected angle. An image of a first portion of the first line of light reflected by the target object (116) is received. An image of a second portion of the first line of light reflected by the measurement surface (118) is received. The received image of the second portion of the first line of light is offset, as a function of the first selected angle and the height of the target object (116) above the measurement surface (118), from the received image of the first portion of the first line of light. The offset of the received light reflected by the target object (116) and the received light reflected by the measurement surface (118) is determined. The height of the target object (116) above the measurement surface (118) is calculated, using the calculated offset and the first selected angle.

The received images are displayed for alignment of the first line of light with the target object (116). The first line of light is strobed. The strobing may be for a predetermined number of times. An image for each strobed first line of light is received and displayed on the monitor (220). The synchronized strobing of the first line of light and the display of the received image on the monitor (22) prevents blurring of the received images due to motion of the remote tool head (108).

The target object (116) and the measurement surface (118) are impinged with a second line of light at a second selected angle and approximately perpendicular to the first line of light. An image of a first portion of the second line of light reflected by the target object (116) is received. An image of a second portion of the second line of light reflected by the measurement surface (118) is received. The received image of the second portion of the second line of light is offset, as a function of the second selected angle, from the received image of the first portion of the second line of light. The offset of the received light reflected by the target object (116) and the received light reflected by the measurement surface (118) is determined. The height of the target object (116) above the measurement surface (118) is calculated using the calculated offset and the second selected angle. The second line of light is also strobed and synchronized with the display.

BRIEF DESCRIPTION OF THE DRAWINGS

FIG. 1 is a block diagram illustrating a laser inspection tool system in accordance with the present invention.

FIG. 2 is a partially broken away perspective view of a remote tool head of the laser inspection tool system of FIG. 1.

FIG. 3 is a partially perspective cutaway view illustrating the light path in the remote tool head of FIG. 2.

FIG. 4 is a pictorial view illustrating the position of the laser lines for a point of intersection below the measurement surface.

FIG. 5 is a pictorial view illustrating the position of the laser lines for a point of intersection on a flat surface.

FIG. 6 is a pictorial view illustrating the position of the laser lines for a point of intersection above the measurement surface.

FIG. 7-8 are flowcharts illustrating the operation of the laser inspection tool system.

FIG. 9 is a schematic view illustrating menu selections on a screen of a monitor of the laser inspection tool system.

FIG. 10 is a schematic view illustrating a screen of the monitor of the remote tool head, as the remote tool head is aligned over a selected portion of the measurement surface.

FIG. 11 is a schematic view illustrating a screen of the monitor of the remote tool head, after the inspection system has made a measurement.

FIG. 12 is a partial perspective view illustrating the transverse offset of the laser line for the height differences between the measurement surface and a target object.

FIG. 13 is a top view illustrating the measurement surface and the target object as viewed by a camera in the remote tool head.

FIG. 14 is a pictorial diagram illustrating the geometry of the distances and angles of the remote tool head, the measurement surface, and the target object for FIGS. 12-13.

FIG. 15 is a partial perspective view illustrating the rotation of the laser line for tilting of the measurement surface relative to the remote tool head.

FIG. 16 is a top view illustrating the measurement surface, the target object, and the rotation of the laser line as viewed by the camera for tilting of the measurement surface relative to the remote tool head.

FIG. 17 is a pictorial diagram illustrating the geometry of the distances and angles of the remote tool head, the measurement surface, and the target object for FIG. 15-16.

FIG. 19 is a top view illustrating the measurement surface, the target object, and the position of the laser line as viewed by the camera for pitching of the measurement surface relative to the remote tool head.

FIG. 20 is a pictorial diagram illustrating the geometry of the distances and angles of the remote tool head, the measurement surface, and the target object for FIG. 18-19.

DETAILED DESCRIPTION OF THE PREFERRED EMBODIMENTS

Figure 18:
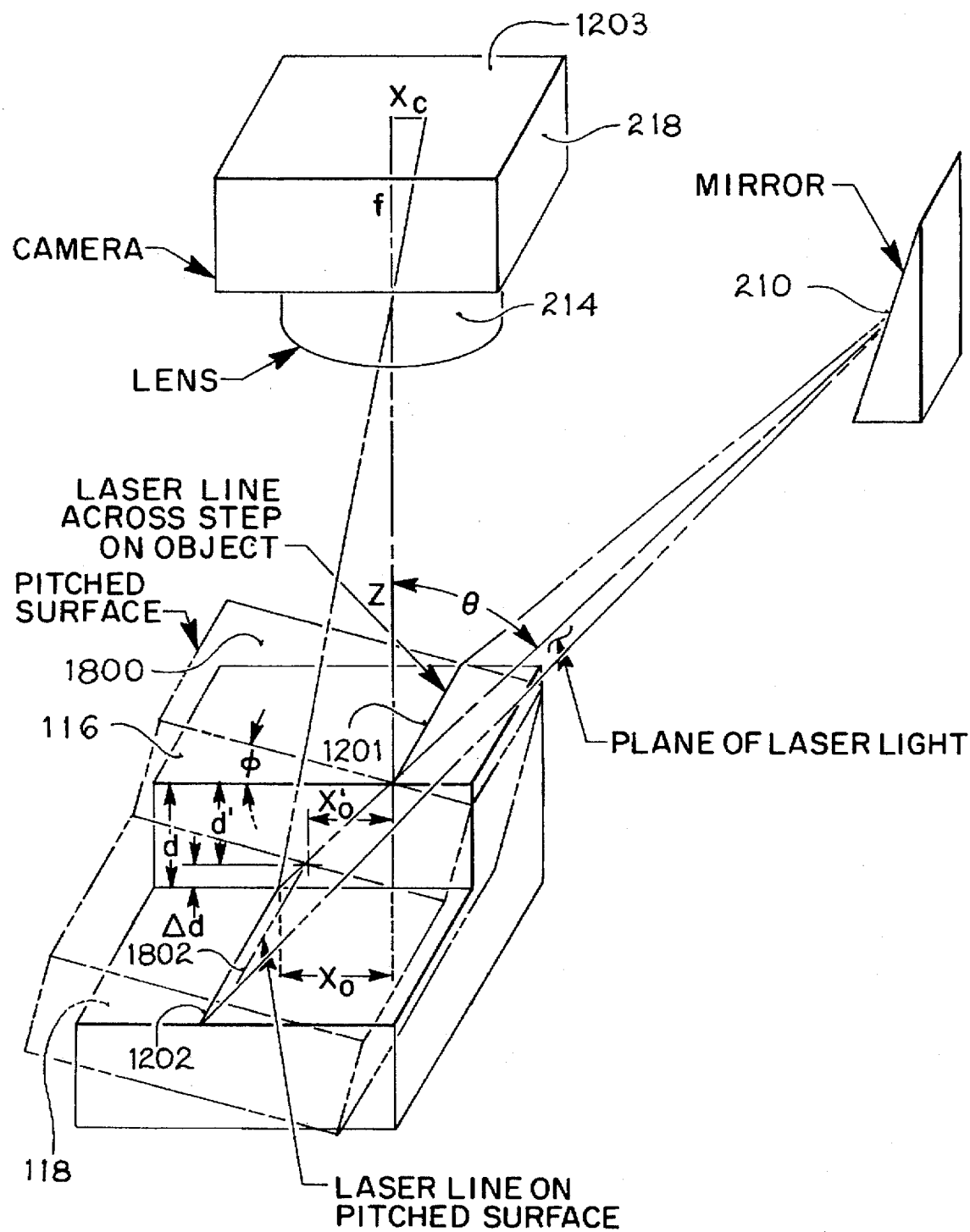
FIG. 18 is a partial perspective view illustrating the translation of the laser line for pitching of the measurement surface relative to the remote tool head.

Referring to FIG. 1, there is shown a block diagram illustrating a laser inspection tool system 100 in accordance with the present invention. The laser inspection tool system 100 includes a computer 102, a power system 104, a system monitor 106, and a remote tool head 108. The laser inspection tool system 100 is an optical measurement system for measuring the height of a target object 116 above a measurement surface 118. The target object 116 is preferably a fastener or rivet. The measurement surface 118 is preferably a missile body or an airframe and typically has a plurality of fasteners extending through holes in the surface 118. In particular, the user specifies the type of fastener that is being tested from a menu of various fasteners and the computer 102 measures the center-pin break-off height of the fasteners on the missile body, determines whether the measured height is within a predetermined range specified for the fastener type, and displays a pass or fail indication and the measured height.

The electronics and power system 104 distributes power to the remote tool head 108. The remote tool head 108 is sufficiently small to be held in and operated using one hand. A cable 114 couples the remote tool head 108 to the power system 104 to allow the user to position the remote tool head 108 to measure the fastener break-off height of the target object 116 on the measurement surface 118 without moving the measurement surface 118. The cable 114 is preferably 35 feet long. The power system 104 also provides buffering for signals communicated between the computer 102 and the system monitor 106, and between the computer 102 and the remote tool head 108. The system monitor 106 displays the field of view of the remote tool head 108 and data and menus generated by the computer 102. The remote tool head 108 includes a remote monitor 120 that also displays the field of view of the remote tool head 108 and the data and menus generated by the computer 102.

The user aligns the remote tool head 108, using the video monitor 120, with the target object 116 and activates the remote tool head 108 to measure the height of the target object 116. The remote tool head 108 transmits a pair of perpendicular lines of light, preferably laser light, toward the target object 116 and the measurement surface 118 and captures an image of the lines of light reflected by the target object 116 and the measurement surface 118. The computer 102 executes a search algorithm that utilizes position data to identify portions of the lines reflected by the target object 116 and reflected by the measurement surface 118. The computer 102 then determines the height of the target object 116 above the measurement surface 118 using triangulation and adjusting for any tilt or pitch angle of the measurement surface 118 introduced by the orientation of the remote tool head 108 relative to the measurement surface 118. This adjustment allows the user to use the remote tool head 108 without the need to position the remote tool head 108 at a preselected orientation.

Referring to FIG. 2 is a partially broken away perspective view of the remote tool 108. Referring to FIG. 3, there is shown a partial perspective cutaway view illustrating the light path in the remote tool head 108. The remote tool head 108 includes a box-shaped housing 202 having an opening 204 on one end. A pair of feet 205 are mounted to a head 209 on the housing 202 along the perimeter of the opening 204 to allow the remote tool head 108 to be placed on the measurement surface 118 so that the optics, discussed below, are approximately at a predefined distance from the measurement surface 118. The hood 209 shields the optics of the remote tool head 109 from background light. The housing 202, the feet 205, and the hood 209 are formed of plastic to prevent damage to the measurement surface 118. A pistol grip handle 206 is mounted to one side of the housing 202 to allow an operator to direct the opening 204 and the electronics and optics, discussed below, within the housing 202 towards the target object 116. A connector 207 on the bottom of the pistol grip handle 206 connects to the cable 114 for communicating with the power system 104.

Light sources 208-1 and 208-2 mounted on the inside of the housing 202 provide light to a respective mirror 210-1 and 210-2 mounted on inner side walls of the housing 202. The light sources 208-1 and 208-2 may be, for example, laser line illuminators. The light sources 208-1 and 208-2 preferably each include a laser diode 212, a focusing lens 214, and a line forming lens 215. The line forming lens 215 is preferably a plano-cylindrical lens. Each laser diode 212 emits a visible or near-infrared beam through the respective focusing lens 214 and through the line forming lens 215 to form a narrow line of light 240, which impinges the respective mirror 210-1 and 210-2 to reflect therespective narrow line 240, through the opening 204 to impinge the target object 116 and the measurement surface 118. The light sources 208-1 and 208-2 and the mirrors 210-1 and 210-2 preferably are oriented so that the narrow lines of light 240 from the sources 208 are approximately perpendicular to each other and are each approximately 28° from the normal of the measurement surface 118. Of course, the selected angles for the narrow lines of light 240 may be different. The narrow lines of light 240 from each light source 208-1 and 208-2 preferably cross in the field of view of the remote tool head 108.

Background lamp illuminators 216, preferably three in number, mounted to the inner sidewalls of the housing 202 provide light to illuminate the target object 116 and the measurement surface 118 to facilitate viewing the target object 116 with the monitor 120 for positioning and alignment of the remote tool head 108 for the height measurement. For clarity, only two background lamp illuminators 216 are shown in FIG. 2.

A camera 218 is mounted inside the housing 202 on an inside surface opposite the opening 204 and has a field of view 242 that receives an image of the target object 116 and the measurement surface 118 and provides a video signal indicative of the image to the computer 102. The camera 218 may provide filtering to block background light. For example, the camera 218 may filter visible light if the laser diodes 212 provide near-infrared lines or may use narrow band filters at the laser wavelength. The remote monitor 120 is coupled to the computer 102 and is mounted to an outside surface of the housing 202 opposite the opening 204. The remote monitor 120 displays the image of the measurement scene received by the camera 218, and also displays menus and data provided by the computer 102, while the user operates the remote tool head 108. The remote monitor 220 may be, for example, a color liquid crystal display (LCD).

Actuation of a first push button 222 on the handle 206 controls the movement of a cursor for a menu of user options on the remote monitor 220. Actuation of a second push button 224 turns on the light sources 208 when required at the appropriate time during the measurement process. Pushing the second push button 224 does not turn on the light sources 208 at other times. The first and second push buttons 222 and 224, respectively, may be actuated, for example, by a thumb of the user. A trigger switch 226 on the handle 206 controls the operation of the remote tool head 108 as described later herein, responsive to actuation by the user, preferably by the index finger. Actuation of the trigger switch 226 allows the operator to select an item on the menu displayed on the remote monitor 220, which activates the operation of the selected item.

Referring in particular to FIG. 4, a camera field of view 300 shows the position of the laser lines for a point of intersection 302 below the measurement surface 118 in which the lines 240 impinging the target object 116 are offset from the lines 240 impinging the measurement surface 118. Likewise, referring in particular to FIG. 6, a camera field of view 304 shows the position of the laser lines 240 for a point of intersection 306 above the measurement surface 118, in which the lines 240 impinging the target object 116 are offset, but in an opposite direction to the offset in the field of view 300, from the lines 240 impinging the measurement surface 118. Referring in particular to FIG. 5, a camera field of view 308 shows the position of the laser lines for a point of intersection 310 on a flat surface. No offset is present. The offset in the field of views 300 and 304 is used to calculate the height of the target object 116 as described below.

Referring again to FIG. 1, the computer 102 includes a video frame grabber 110, a controller 112, and a keyboard 124. The remote tool head 108 provides a video signal to the video frame grabber 110 which captures the video signal for processing as described later herein.

The controller 112 monitors the buttons 222 and 224 and the trigger 226 and provides control signals to a controller 228 that controls the light sources 208-1 and 208-2 and the illuminator lamps 216, the camera 218, and the monitor 220. The optics may be shock mounted to the housing 202.

The computer 102 executes a program to perform the measurement of the height of the fasteners. The computer 102 may provide, for example, a Windows (TM) user interface on the system monitor 106.

Referring to FIGS. 7-8, there are shown flowcharts illustrating the operation of the laser inspection tool system 100. Referring to FIGS. 9-11, there are shown the screens of the remote monitor 220 of the remote tool head 108 and of the system monitor 106. The computer 102 displays a menu 900 (FIG. 9) on a screen 901, which provides a list of options to the user to select the rivet type, select the laser, select the washer type, execute the measurement of the rivet, or quit the use of the remote tool head 108. The user controls the cursor on the menu using the button 222 on the handle 206 of the remote tool head 108 and selects an item from the menu by actuating the trigger 226. After the user makes a selection for rivet type, the computer 102 displays the selection in a selection window 902 on the remote monitor 220 and the system monitor 106.

If the user selects 704 "rivet type" from the displayed menu 900, the computer 102 displays 706 a menu (not shown) of rivet part numbers. After the user selects the rivet part number, the computer 102 sets type parameters of the imaging algorithm and the pass/fail criteria for the target object 116 based on the selected rivet type and displays the selected rivet type in the selection window 902. Here, the user selects a rivet part number 990, which is a ¼ inch "hucks" type rivet that is made of aluminum.

If the user selects 712 "laser" from the displayed menu 900, the computer 102 displays a menu (not shown) for selecting the horizontal laser line, the vertical laser line, or both laser lines. After the user selects 716 the laser line, the computer 102 enables the corresponding light source 208.

If the user selects 720 "washer type" from the displayed menu 900, the computer 102 displays a menu (not shown) of types or part numbers of washers. After the user selects 724 the washer type, the computer 102 sets the parameters of the imaging algorithm for the selected washer type and displays the washer type in the selection window 902.

If the user selects 734 "measure rivet" from the displayed menu, the computer 102 executes 736 the measurement as described in conjunction with FIG. 8.

If the user selects 738 "quit remote" testing from the displayed menu 900, the computer 102 executes a quit routine that transfers control of the inspection system 100 back to the keyboard 124 and the computer 102, with displays a computer screen (not shown).

Referring in particular to FIG. 8, the computer 102 activates 802 the lamp illuminators 216 to illuminate the target object 116 and the measurement surface 118, activates 438 the light sources 208-1 and 208-2, and adjusts the illuminators 216 and the lasers 214 for the reflectivity of the measurement surface 118. The computer 102 then displays the image received by the camera 218 (video page 0 (VPG0)) with an overlay of an alignment box 1002 on a screen 1000 (FIG. 10) on the remote monitor 220 of the remote tool head 108 and on the system monitor 106, as the user aligns the remote tool head 108 with the target object 116.

Using the displayed image, the user positions the remote tool head 108 to align the remote tool head 108 with the target object 116 using the alignment box 1002 on the remote monitor 220. When the remote tool head 108 is properly positioned, the user actuates the second button 224. In response to the actuation, the controller 112 strobes the light from the laser diodes 208-1 and 208-2 to provide lines of repeated pulses of short duration and differing duty cycles to vary the intensity of the measured laser light.

The controller 112 monitors the first button 222 and the trigger 226. If 804 the trigger 226 is not actuated and the first button 222 is actuated 806, the computer 102 terminates the measurement operation. The trigger 226 is actuated after positioning alignment is completed to acquire the measurement data. When the trigger 226 is actuated, the lamp illuminators 216 are turned off 810 and the last several short laser pulses are captured to thereby freeze the image to reduce the smearing of the image of the light caused by movement of the remote tool head 108 and the camera 218 relative to the target object 116 and the measurement surface 118. The strobed light from the laser diodes 208-1 and 208-2 preferably is captured four times. The first captured image (video page 1 or VPG1) includes both lasers on at high intensity for video display to the user; the second image (video page 2 or VPG2) includes both laser lines with intensities set to provide a high contrast image of the measurement surface 118; the third image (video page 2 or VPG2) includes the horizontal laser line only with the brightness set to provide a high contrast image of the top of the fastener 116; the fourth image (video page 3 or VPG3) includes vertical laser line only with the brightness set to provide a high contrast image of the top of the fastener 116. The computer 102 commands the video frame grabber 110 to acquire the video data for each image of the strobed light from the camera 218 and stores the data in the memory of the video frame grabber 110. The video frame grabber 110 displays 812 the video page 0 and analyzes the video data and the computer 102 determines the height of the target object 116 above the measurement surface 118. The computer 102 displays a screen 1100 (FIG. 11) showing the search results. An accept/reject prompt may also be displayed. If 814 the first button 222 is actuated, the test is terminated. If 814 the second button 224 is actuated, the computer 102 displays 816 the measurement results.

Referring to FIG. 12, there is shown a partial perspective view illustrating the transverse offset of the laser line for the height differences between the measurement surface 118 and the target object 116. Referring to FIG. 13, there is shown a top view illustrating the measurement surface 118 and the target object 116 as viewed by the camera 218. Referring to FIG. 14, there is shown a pictorial diagram illustrating the geometry of the distances and angles of the remote tool head 108, the measurement surface 118, and the target object 116 for FIGS. 12–13. Because the plane of the line of laser light is at an angle relative to the measurement surface 118 and the target object 116, the line 1201 impinging the target object 116 is translationally offset a distance $X_o$ from the line 1202 impinging the measurement surface 118, and thus, appears on the remote monitor 220 offset a distance $X_c$ from the line 1202 impinging the measurement surface 118.

An image plane 1203 in the camera 218 is spaced apart from the focusing lens 214 by a focus distance f approximately equal to a focal length of the focusing lens 214, or the camera focal length. The computer 102 calculates the height d of the target object 116 using triangulation techniques. The camera/laser angle θ between the camera 218 and the line of laser light reflected by the mirror 210 establishes the projection angle of the line of light onto the target object 116 and the measurement surface 118 and the triangulation relationship. The computer 102 has stored therein the focus distance f, a stand-off distance Z, which is the distance between the focusing lens 214 and a preselected reference plane 1401 spaced apart from the focusing lens 214, the camera/laser angle θ, the magnification M (=Z/f), and a magnification factor K (=M/tan(θ)).

The height d is calculated by triangulation as $$d = X_o / \tan(\theta) \tag{1}$$

where $X_o$ is the translational offset or position of the laser line on the measurement surface 118. From similar triangles, the offset $X_o$ is calculated by $$X_o = (Z+d)X_c/f \tag{2}$$

where $X_c$ is the distance measured on the focal plane of the camera 218. Solving equations (1) and (2) provides $$d = \frac{ZX_c}{f \tan(\theta) - X_C} \tag{3}$$

or $$d = \frac{MX_C}{\tan(\theta) - X_C/f} \tag{4}$$

or $$d = \frac{KX_C}{(1 - KX_C/Z)} \tag{5}$$

The computer 102 calculates the distance $X_c$ from the image and calculates the height d using equation (3), (4), or (5).

Referring to FIG. 15, there is shown a partial perspective view illustrating the rotation of the laser line for tilting of the measurement surface 118 relative to the remote tool head 108. Referring to FIG. 16, there is shown a top view illustrating the measurement surface 118, the target object 116 and the rotation of the laser line as viewed by the camera 218. Referring to FIG. 17, there is shown a pictorial diagram illustrating the geometry of the distances and angles of the remote tool head 108, the measurement surface 118, and the target object 116 for FIGS. 15–16. In the geometry described herein, the rotation of the measurement surface 118 relative to the laser line in the direction of the laser line, e.g. rotation about an axis perpendicular to the laser line, is referred to as a tilt and is shown as a tilted surface 1500. The computer 102 determines the azimuth tilt angle Ω relative to horizontal to the focal plane of the camera 218 from the rotational or angular offset or the angle of laser lines measured relative to a coordinate system axis of the camera focal plane, which is predetermined by the orientation of the pixels (not shown) in the camera 218. A laser line 1501 on the target object 116 as viewed by the camera 218 is represented by the equation:

$$y = \tan(\Omega)X + a_1 \tag{6}$$

A laser line 1502 on the measurement surface 118 as viewed by the camera 218 is represented by the equation $$y = \tan(\Omega)X + a_2 \qquad (7)$$

The measured height d' is calculated by the equation:

$$d' = a_1 - a_2 \qquad (8)$$

The computer 102 calculates the height d of the target object 116 above the measurement surface 118 using the equation:

$$d = d' \cos(\Omega) \qquad (9)$$

Referring to FIG. 18, there is shown a partial perspective view illustrating the translation of the laser line for pitching of the measurement surface relative to the remote tool head. Referring to FIG. 19, there is shown a top view illustrating the measurement surface, the target object, and the position of the laser line as viewed by the camera 218. Referring to FIG. 20, there is shown a pictorial diagram illustrating the geometry of the distances and angles of the remote tool head, the measurement surface, and the target object for FIG. 18–19. If either the remote tool head 108 or the target object 116 is rotated or pitched forward or backward around the laser line, e.g. rotated in a direction about the laser line as the rotational axis, the angle of pitch rotation is indicated by the rotational or angular offset or tilt of the other perpendicular laser line. As seen in FIG. 18, the separation between the pitched and unpitched laser lines changes with the pitch rotation and thus the camera 218 views no direct indication of a pitch rotation. However, the pitch rotation is indicated by the other laser line, which is perpendicular, and is projected onto the measurement surface 118. Thus, a pitch angle for one laser line is seen as a tilt angle of the other perpendicular laser line. In particular, a laser line 1802 is shown on a pitched surface 1800. The computer 102 uses the tilt angle $\Omega$ for one laser line to correct the error associated with pitch angles $\phi$ for the other laser line. From FIG. 20, the uncorrected height d' is given by the equation:

$$d = \frac{x_0}{\tan\theta} \qquad (10)$$

and a measurement error $\Delta d$ is given by the equation:

$$\Delta d = X_0 \tan \phi \qquad (11)$$

The corrected height d is given by the equation $$d = d' + \Delta d \qquad (12)$$

After combining equations (10), (11) and (12), the computer 102 calculates the height d of the target object 116 above the measurement surface 118 using the equation:

$$d = d'(1 + \tan(\theta) \tan(\phi)) \qquad (13)$$

where $\phi$ is the angle of elevation or the pitch angle measured from an orthogonal line to the plane of the laser light and d' is the height of the target object 116 measured with the pitched surface.

After performing these calculations of the height of the target object 116, the computer 102 determines whether the measured height is within the predefined range of acceptable heights for the selected type of fastener. The computer 102 displays, as shown in screen 1100 (FIG. 11), the minimum and maximum heights for the selected type of fastener, the measured height for the target fastener, a pass or fail indication. and the areas 1102 of the target object 116 and the measurement surface 118 where the image was sampled for the measurement.

The computer 102 may store the measurement data and may use such data for statistical analysis, for example, to detect failure trends in different missile segments to determine if changes in manufacturing operations are warranted.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

We claim:

1. An inspection system for determining the height of a target object above a measurement surface, said system comprising:

first and second light sources spaced apart from the measurement surface and generating respective first and second lines of light, both lines of light being projected at a projected angle onto the target object and the measurement surface, the first line of light being at an angle to the second line of light;

a camera positioned to receive both an image of a first portion of the first line of light reflected by the target object and an image of a second portion of the first line of light reflected by the measurement surface and positioned to receive both an image of a first portion of the second line of light reflected by the target object and an image of a second portion of the second line of light reflected by the measurement surface, the received image of the first portion of the first line of light reflected by the target object being offset from the received image of the second portion of the first line of light reflected by the measurement surface, the received image of the first portion of the second line of light reflected by the target object being offset from the received image of the second portion of the second line of light reflected by the measurement surface, and a processor coupled to the camera for calculating the offsets between the received light reflected by the target object and the received light reflected by the measurement surface, for calculating the height of the target object above the measurement surface using the calculated offsets, and for adjusting the calculated object height to compensate for an alignment error of the inspection system.

2. The inspection system of claim 1 further comprising a monitor coupled to the camera for displaying said images.

3. The inspection system of claim 1 wherein the light sources strobe the light lines to freeze the motion of the camera relative to the measurement surface and the target object and to vary a duty cycle of the light lines to set an intensity of the reflected lines of light by the camera.

4. The inspection system of claim 1 wherein the first line of light is approximately perpendicular to the second line.

5. The inspection system of claim 1 wherein the images of the first line of light reflected by the target surface and the measurement surface and the images of the second line of light reflected by the target surface and the measurement surface are at an angle relative to each other, and the processor calculates the height of the target object above the measurement surface using both the offset and said angle.

6. The inspection system of claim 1, wherein the alignment error comprises a tilt angle and a pitch of the target object relative to the inspection system.

7. The inspection system of claim 6, wherein the processor calculates the tilt angle and the pitch from the received light reflected by the target object and the received light reflected by the measurement surface.

8. A method for measuring the height of a target object above a measurement surface, the method comprising the steps of:

impinging the target object and the measurement surface with a first line of light at a first selected angle;

impinging the target object and the measurement surface with a second line of light at a second selected angle, the second line of light being at a third selected angle to the first line of light;

receiving an image of a first portion of the first line of light reflected by the target object;

receiving an image of a first portion of the second line of light reflected by the target object;

receiving an image of a second portion of the first line of light reflected by the measurement surface, the received image of the second portion of the first line of light being offset, as a function of the first, second, and third selected angles, from the received image of the first portion of the first line of light;

receiving an image of a second portion of the second line of light reflected by the measurement surface, the received image of the second portion of the second line of light being offset, as a function of the first, second and third selected angles, from the received image of the first portion of the second line of light;

determining the offsets of the received light reflected by the target object and the received light reflected by the measurement surface;

calculating an uncorrected height of the target object above the measurement surface using the determined offsets and the first, second and third selected angles;

calculating an alignment error using the determined offsets and the first, second and third selected angles; and calculating the height of the target object above the measurement surface using the uncorrected height and the alignment error.

9. The method of claim 8 further comprising the step of displaying the received images for alignment of the first line of light with the target object.

10. The method of claim 8 wherein the step of impinging further comprises the step of strobing the lines of light.

11. The method of claim 10 wherein the step of strobing includes the step of strobing the first line of light and the step of strobing the second line of light.

12. The method of claim 8 wherein the third selected angle is approximately 90°.

13. The method of claim 8, wherein the step of calculating an alignment error comprises the step of calculating a tilt angle and a pitch shared by both the target object and the measurement surface relative to a remote tool head.

14. An inspection tool for measuring the height of a target object above a measurement surface the inspection tool comprising:

a remote tool head comprising:
first and second light sources generating respective first and second lines of light, the lines of light projected at respective first and second angles onto the target object and the measurement surface, the first line of light being at a third angle to the second line of light; and a camera positioned to receive reflections of the first and second lines of light from the target object and the measurement surface; and a computer system in communication with the remote tool head, the computer system comprising:
means for calculating offsets between the received light reflected by the target object and the received light reflected by the measurement surface;

means for calculating an uncorrected height of the target object above the measurement surface and an alignment error from the first, second and third angles and the offsets; and means for calculating the height of the target object above the measurement surface from the uncorrected height and the alignment error.

15. The inspection tool of claim 14, wherein the means for calculating the alignment error comprises:
means for calculating a tilt angle and a pitch shared by both the target object and the measurement surface relative to the remote tool head.

* * * * *